United States Patent [19]

Dias et al.

[11] Patent Number: 4,532,091
[45] Date of Patent: Jul. 30, 1985

[54] METHOD OF PRODUCING PERMEABLE, POROUS MOLDED BODIES OF SILICON CARBIDE

[75] Inventors: Francisco J. Dias, Jülich; Marian Kampel, Heinsberg-Oberbruch; Hartmut Luhleich, Düren, all of Fed. Rep. of Germany

[73] Assignee: Kernforschungsalage Jülich GmbH, Jülich, Fed. Rep. of Germany

[21] Appl. No.: 579,657

[22] Filed: Feb. 13, 1984

[30] Foreign Application Priority Data

Feb. 18, 1983 [DE] Fed. Rep. of Germany ....... 3305529

[51] Int. Cl.$^3$ ................................................ C01B 31/36
[52] U.S. Cl. ..................................... 264/29.5; 264/60; 264/63; 264/65
[58] Field of Search ..................... 264/60, 63, 65, 29.5

[56] References Cited

U.S. PATENT DOCUMENTS

| | | | |
|---|---|---|---|
| 3,947,550 | 3/1976 | Fitchmun | 264/63 |
| 4,154,787 | 5/1979 | Brown | 264/60 |
| 4,248,814 | 2/1981 | Yajima | 264/65 |
| 4,385,020 | 5/1983 | Morelock | 264/63 |

*Primary Examiner*—James Derrington
*Attorney, Agent, or Firm*—Frishauf, Holtz, Goodman & Woodward

[57] ABSTRACT

A porous green-state body of carbon, with or without silicon carbide, made with a cokable binder, is crumbled to produce relatively coarse grains in the range from 0.2 to 10 mm and a fraction of the particles so produced with a much more limited range of grain size is then used to produce a second green-state body, which is then coked, siliconized if the silicon is not already provided in the making of the precursor body that was broken up, and converted into a silicon carbide body. If the siliconizing is done by immersion in a bath of molten silicon, the excess silicon is removed by vaporization or by boiling in sodium hydroxide solution.

12 Claims, No Drawings

METHOD OF PRODUCING PERMEABLE, POROUS MOLDED BODIES OF SILICON CARBIDE

This invention concerns a method for producing porous and permeable or pervious molded bodies of silicon carbide capable of being used as hot gas filters, for instance.

A method of producing porous molded bodies of silicon carbide is known from German published patent application DE-OS 30 05 587. Such molded bodies are distinguished not only by their ability to withstand extreme temperatures and temperature fluctuations, but also by a good resistance to corrosion in the presence of air and steam.

The molded bodies produced in accordance with the known process just mentioned do have a through-going (permeable) porosity that permits the passage of a medium through them. For practical applications as permeable molded bodies, for example, as hot gas filters, flow-through electrodes, catalyst carriers or the like, the molded bodies produced according to the known process are not suitable, however, because in these applications the gas or liquid quantity flowing through them must be great, which is not obtainable with the known molded bodies, because the pores are of an order of magnitude only up to about 100 microns (0.1 mm).

SUMMARY OF THE INVENTION

It is an object of the present invention to provide a method of manufacturing porous molded bodies of silicon carbide which allow the flow of sufficient quantities of gas or liquid through such bodies to enable them to be utilized as hot gas filters, flow-through electrodes, catalyst carriers or the like.

Briefly, a mixed powder is formed by mixing a cokable organic binder with either a carbon powder or both carbon powder and silicon and/or from 0 to 70% by weight of silicon carbide powder and molding a precursor body therewith in the green state, after which the precursor body, instead of being fired, is crumbled into granules that are, so far as possible, quite coarse. From the granular material thus obtained, a grain-size fraction is sifted out having a grain size in the range between 0.2 and 10 mm, the particular grain size depending upon the desired degree of permeability to be provided in the porous body. What is sifted out for use, instead of having grain sizes running all the way between the limits just mentioned, is a fraction of relatively uniform grain size, as is obtainable by using standard sieve mesh sizes, which typically involves providing a fraction in which the maximum grain size does not exceed twice the minimum grain size, the grain size range being preferably somewhat less than that, and the average or medium grain size being selected so as to obtain the intended permeability of the end product.

With the material of the grain size thus selected, resulting from the breaking up of the "green" precursor body, a second "green" body is molded, and here care is taken that in the pressing of the molded product to produce a green body, the pressure should be relatively light in order to obtain a relatively high permeability and somewhat heavier, or considerably heavier, where a body of relatively lower permeability is desired. The second green body is then coked in vacuum or in an inert gas atmosphere by heating it up to a temperature in the range between 600° and 1000° C. Then, in the case the mixed powder from which the first green body was made, in addition to the binder, contained only carbon powder or carbon powder with an admixture of silicon carbide powder, the coked body is siliconized to convert the carbon to silicon carbide, either by dipping the coked body in a molten silicon bath or by the penetration of silicon vapor, the conversion into silicon carbide taking place in either case at a temperature in the temperature range between about 1400° C. and 1900° C. In the case that the composite powder used, along with the binder, to make the first green body was composed of carbon powder and silicon powder, with or without an additive of silicon carbide powder, then, after coking the body is rapidly heated up in an argon atmosphere to a temperature in the range from about 1400° C. up to 1900° C., as the result of which the silicon combines with carbon to form silicon carbide.

In the case of dipping the molded body in a silicon bath, care must be taken that before the body is cooled down, any excess of free silicon should be removed so much as possible from the large pores.

The mixing of the starting material powder with the cokable binder can be performed by means of kneading or mixing machines. It is particularly advantageous, however, for the preparation of the composite powder to be performed according to the process disclosed in the above-mentioned German published patent application DE-OS 30 05 587, which corresponds, in its disclosure, to U.S. patent application Ser. Nos. 233,475 now abandoned, and 418,679 owned by the assignee of the present application. In that manner it is assured that the precursor body has a comparatively high porosity and relatively great strength. It is, accordingly, desirable in the provision of the mixed powders to suspend the carbon powder, made of brown coke, electrographite, natural graphite, wood charcoal or other similar materials and/or carbon black, or else the carbon and silicon powders, and/or (in either of the foregoing cases) the silicon carbide powder, preliminarily in a liquid selected for at least partially dissolving the binder and then to dissolve the binder of pitch, tar, synthetic resin or the like wholly or partly in the liquid, and then to introduce the liquid with its dissolved and suspended material into a second liquid with which the first liquid is miscible but in which the binder is either insoluble or soluble only with difficulty. In the case of phenolic resin or pitch the second liquid will usually be water. The result of this procedure is to coat the particles of powder and to precipitate them as a mud, after which the particles forming the muddy mass are freed of the supernatant liquid by decanting and are finally dried.

It is of advantage, further, for the suspension to be squirted into the second liquid in a mixing chamber by means of a mixing nozzle in such a way that the solid particles are uniformly coated with the binder.

The production of the green-state precursor body from the dry mixed powder is performed by a known method, such as die pressing, extrusion, drossing, or the like. In this step of the process of the present invention, however, it is advantageous to proceed by the method described in U.S. Pat. Nos. 3,927,187, 4,059,682, and 4,060,592, namely, preliminarily drying the mud from which the supernatant liquid has been decanted, then putting the resultant powder a drying mold provided for shaping the green body, then exposing it, to the vapor of liquids in which the binder is entirely or partly soluble and then drying with some heating. The binder content in the dried powder used exceeds 25% by weight. By proceeding in the way just described, the shaping of the powder into green-state bodies can be performed by molding even in complicated configurations.

It is likewise useful in the production of the second green-state body to make an analogous use of the methods of the above-mentioned three U.S. patents. In this case the grain-size fraction selected for the second green-state body is the starting material. This starting material does not need to be subjected to another step of coating with a binder and the granulated material can be directly put in a drying mold provided for shaping the second green body, after which it is preferred to provide another opportunity for exposing it to vapor of liquids in which the binder is entirely or partly soluble, which are drawn into the mold, and another application of moderate heat for drying.

The crumbling of the green-state body is best performed with a jaw-type crusher that is so adjusted that a principal grain size corresponding to the desired permeability of the end product will be produced. The greater the gas or liquid throughput of the end product is designed to be, the greater the grain size of the particles should be selected. Even if the crusher delivers the desired principal grain size in its output, the final output is selected by a corresponding sieve fraction for assuring a certain degree of grain size uniformity. From a powder thus made up with a relatively uniform grain size a green body is again produced, preferably by means of die pressing, with the pressure of the pressing carefully set because for the same grain size, the permeability of the final body will be the greater, the lighter the pressing force is.

At this stage, the use of the processing method disclosed in the above-mentioned copending U.S. application Ser. Nos. 233,475, now abandoned, and 418,679 and in published German patent application 30 15 587 for the preparation of the mixed powders also has a favorable effect in that, as a result of the uniform coating of the powder grains with a binder skin, the pressing forces required for the production of the second green body can be very small and, in spite of that fact, a green-state body can be produced which is of a coherence and strength that is comparatively great.

The second molded body made by crumbling of the precursor body and utilization of a grain-size fraction obtained therefrom consists of a granulate of grains of the material of the first body and, like the end product made after further heating steps, has relatively large pores.

The invention is further described by reference to specific illustrative examples.

EXAMPLE 1

151 g of electrographite powder of a grain size sifted to exclude sizes greater than 80 μm and smaller than 60 μm were mixed with 790 g of a fine-grain silicon powder and the powder grains of this mixture were evenly coated with a phenolformaldehyde resin binder. The binder content (314 g) of the resulting product was 25% by weight. This powder mixture was evenly filled into a box mold having a bottom surface measuring 160 mm × 140 mm. The bottom plate of the molding box was perforated with a considerable number of holes of 4 mm diameter. Before filling darying with powder, the filled box had been lined with two layers of filter paper. After filling, the powder was covered over with two layers of filter paper and a punch mating the die formed by the mold box, and perforated in the same manner as the bottom plate of the drying mold, was placed on top of the contents of the box. The mass of the punch was so chosen that it exerted a pressure of 150 mbar on the powder mass.

The mold box thus filled and equipped was then placed in a drying chamber that was preheated to 70° C and the drying chamber was then evacuated to about 0.5 mbar. Then methanol vapor was introduced into the drying chamber until a pressure of 600 mbar was reached, after which this pressure was allowed to be exerted on the powder mass for half an hour. The drying compartment was then evacuated and aerated. After the mold box had cooled, the contents were removed. The molded body thus produced had the dimensions 160 mm × 140 mm × 56 mm, and the geometrical density of 1.2 g/cm$^2$. The green precursor body thus obtained was first coarsely broken up and then further crumbled in a jaw-type crusher. A fraction having a grain size running from 1.4 mm to 2 mm was separated by sifting from the particle mixture obtained by breaking up and crushing.

45 g of the granulate fraction obtained as above described was filled to a uniform height in a rectangular box drying mold having a bottom surface of 70 mm × 80 mm and loaded down with a fitting punch, the mass of which was such as to exert a pressure of 100 mbar on the granulate filling of the mold. The box mold filled and prepared as just mentioned was then put in a drying chamber preheated to 140° C. and heated there for two hours. Then the box mold was again taken out and, after it had cooled, the contents were removed. The green body in the shape of a granulate plate was then coked in an inert gas atmosphere by heating up to 800° C. The coked molded body was finally converted into silicon carbide in a particular gas atmosphere by heating up to 1800° C. The body thus obtained had the dimensions of 76.2 mm × 66.8 mm × 7.4 mm and an air permeability of 1.20 liters per cm$^2$ per minute at a pressure difference of 20 mmWC (water column).

EXAMPLE 2

900 g of an electrographite powder sifted to select a grain size from 60 μm to 80 μm was coated with 30 percent by weight of a phenolformaldehyde binder and the coated particles were then filled in a drying mold box and a mating stamp or punch was placed over the filling. The mold box was then heated for two hours in a drying chamber that had been preheated to 110° C. Then the powder mass was pressed with 1 bar of pressure to make a green precursor body and, after cooling, the body was removed from the mold. The molded body had a density of 1.00 g/cm$^2$. The green precursor body was then coarsely broken up and then further crumbled by means of a jaw-type crusher. Various fractions were sifted out from the resulting mixture of particles.

40 g of granulate of a grain size from 1.4 mm to 2.00 mm were evenly filled into a rectangular drying mold box having a bottom surface of 70 mm × 80 mm and then loaded with a mating punch having a mass such that a pressure of 50 mbar was exerted on the granulate mass. The mold box was then put into a drying chamber that had been preheated to 140° C. After heating up to that temperature, it was taken out again and the contents of the mold box were removed. The green body, which had the shape of a granulate plate, was then coked by heating up to 800° C. in an inert gas atmosphere.

The coked molded body was then brought up to the temperature of a molten silicon bath maintained at a temperature above 1450° C., after which, while the bath was protected by an argon atmosphere, the body was immersed in the bath, as the result of which it was impregnated with silicon and the carbon was converted into silicon carbide. The residual silicon situated in the pores after immersion was then evaporated out in vacuum at temperatures above 1800° C. The body thus produced had an air permeability of 0.8 liters per cm squared per minute at 20 mmWC pressure difference.

EXAMPLE 3

A silicon carbide body produced as above described in Example 2 was, after the step of immersion in a silicon bath, taken out of the furnace in which the silicon bath was maintained, cooled down and then, instead of evaporating out of the residual silicon at temperatures above 1800° C., had its silicon situated in the pores removed by boiling in 10% sodium hydroxide solution, after which the body was rinsed in water and dried. The body thus formed had an air permeability of 0.75 liters per cm squared per minute at 20 mmWC pressure difference.

Although the process of the invention has been illustrated by reference to particular illustrative examples, it will be understood that further variations and modifications are possible within the inventive concept.

We claim:

1. Method of producing permeable porous molded bodies of silicon carbide, comprising the steps of:
    molding a green-state precursor body from a composite powder made of carbon particles, silicon particles, from 0 to 70% by weight of silicon carbide particles, and a cokable organic binder;
    breaking up said precursor body into a coarse granulate of a principal grain size in the range from 0.2 to 10 mm;
    obtaining from said granulate a fraction thereof of limited size range, said limited size range not exceeding a 2:1 ratio between the largest and smallest granules;
    molding a second green-state body from said granulate fraction, with application of pressure which is selected from relatively light to heavy to produce the desired permeability of the silicon carbide body;
    coking said organic binder by heating said second green-state body up to a temperature in the range between 600° and 1000° C. in vacuum or in an inert atmosphere, and
    converting the carbon and silicon of said body into silicon carbide by rapidly heating up said body, after the coking of said organic binder, to a temperature between 1400° and 1900° C. in an inert atmosphere.

2. Method of producing permeable porous molded bodies of silicon carbide, comprising the steps of:
    molding a green-state precursor body from a composite powder made of carbon particles, from 0 to 70% by weight of silicon carbide particles and a cokable organic binder;
    breaking up said precursor body into a coarse granulate of a principal grain size in the range from 0.2 to 10 mm;
    obtaining from said granulate a fraction thereof of limited size range, said limited size range not exceeding a 2:1 ratio between the largest and smallest granules;
    molding a second green-state body from said granulate fraction, with application of pressure which is selected from relatively light to heavy to produce the desired permeability of the silicon carbide body;
    coking said organic binder by heating said second green-state body up to a temperature in the range between 600° C. and 1000° C. in vacuum or in an inert atmosphere, and
    treating said second molded body with silicon vapor at a temperature between 1400° and 1900° C. and thereby converting carbon therein into silicon carbide.

3. Method of producing permeable porous molded bodies of silicon carbide, comprising the steps of:
    molding a green-state precursor body from a composite powder made of carbon particles, from 0 to 70% by weight of silicon carbide particles and a cokable organic binder;
    breaking up said precursor body into a coarse granulate of a principal grain size in the range from 0.2 to 10 mm;
    obtaining from said granulate a fraction thereof of limited size range, said limited size range not exceeding a 2:1 ratio between the largest and smallest granules;
    molding a second green-state body from said granulate fraction, with application of pressure which is selected from relatively light to heavy to produce the desired permeability of the silicon carbide body;
    coking said organic binder by heating said second green-state body up to a temperature in the range between 600° and 1000° C. in vacuum or in an inert atmosphere, and
    immersing said second molded body in a bath of molten silicon, thereby converting uncombined carbon into silicon carbide, and
    thereafter removing excess uncombined silicon from said second molded body.

4. Method according to claim 3 in which the step of removing excess uncombined silicon from said second molded body is performed by vaporizing said uncombined silicon.

5. Method according to claim 3 in which the step of removing excess uncombined silicon from said second molded body is performed by treating said second molded body with a boiling solution of sodium hydroxide, followed by rinsing.

6. Method according to claim 1, claim 2 or claim 3 in which said composite powder from which said green-state precursor body is molded is provided by suspending said particles in a liquid and then partly or wholly dissolving therein a binder selected from the group consisting of pitch, tar, natural and synthetic resin, and thereafter introducing the resulting solution into a second liquid with which said first liquid is miscible but in which said binder is either insoluable of soluable only with difficulty and thereby causing the suspended particles to be coated with said binder and to settle in a muddy mass, followed by decanting the supernatant liquid and drying of said muddy mass, said carbon particles being selected from the group consisting of ground coke, electrographite, natural graphite, wood charcoal, vegetable charcoal, carbon black and mixtures of two or more of the foregoing.

7. Method according to claim 6 in which the introduction of said suspension into said second liquid is produced by injecting said suspension into a mixing chamber by means of a mixing nozzle in such a way that said particles are uniformly coated with said binder.

8. Method according to claim 6 in which said muddy mass is first dried and then, in said step of molding said precursor body, is introduced into a drying mold, after which it is exposed to vapor of liquid in which said binder is wholly or partly soluble in said mold, after which the contents of said mold are dried by aeration.

9. Method according to claim 6 in which the binder content of said dried powder amounts to more than 25% by weight of said mass.

10. Method according to claim 1, claim 2 or claim 3 in which the step of molding said second green-state body from said granulate fraction includes placing said granulate fraction in a drying mold provided for the shaping and drying thereof, then exposing said granulate fraction to vapor of liquid in which said binder is partly or wholly soluble and then further drying the material in said mold by aeration.

11. Method according to claim 8, in which the exposure of said mass to said vapor in said drying mold and the subsequent drying of said mass in said mold is performed by evacuation and aeration.

12. Method according to claim 10, in which the exposure of said granulate fraction to said vapor in said drying mold and the subsequent drying of said granulate in said mold is performed by evacuation and aeration.

* * * * *